United States Patent [19]

Kanemori et al.

[11] Patent Number: 5,287,206
[45] Date of Patent: Feb. 15, 1994

[54] ACTIVE MATRIX DISPLAY DEVICE

[75] Inventors: Yuzuru Kanemori, Tenri; Masaya Okamoto, Nara; Katsuhiro Kawai, Yamatotakada; Mitsuaki Hirata; Takehisa Sakurai, both of Tenri; Hideji Marumoto, Kashiba, all of Japan

[73] Assignee: Sharp Kabushiki Kaisha, Osaka, Japan

[21] Appl. No.: 798,722

[22] Filed: Nov. 27, 1991

[30] Foreign Application Priority Data

Nov. 30, 1990 [JP]  Japan ................... 2-338881

[51] Int. Cl.⁵ .................. G02F 1/1333; G02F 1/1343
[52] U.S. Cl. ......................... 359/59; 359/87; 359/79; 359/54
[58] Field of Search ........ 359/54, 55, 57, 58, 359/59, 79, 87; 357/23.7; 340/784

[56]   References Cited
U.S. PATENT DOCUMENTS

| | | | |
|---|---|---|---|
| 4,955,697 | 11/1990 | Tsukada et al. | 359/57 |
| 4,991,939 | 2/1991 | Momose et al. | 359/59 |
| 5,047,819 | 9/1991 | Tanaka et al. | 359/59 |
| 5,062,690 | 11/1991 | Whetten | 359/59 |
| 5,103,330 | 4/1992 | Fukami et al. | 359/59 |

FOREIGN PATENT DOCUMENTS

| | | |
|---|---|---|
| 0375233 | 6/1990 | European Pat. Off. . |
| 59-119322 | 11/1984 | Japan . |
| 2-82522 | 11/1989 | Japan ................... 359/87 |
| 2-156227 | 6/1990 | Japan . |
| 2-221936 | 9/1990 | Japan . |
| 2-275927 | 11/1990 | Japan . |
| 2-284120 | 11/1990 | Japan . |

OTHER PUBLICATIONS

Patent Abstracts of Japan vol. 14, No. 59 (P-1000)2 Feb. 1990 & JP-A-1 283 519 (Sanyo) 15 Nov. 1989.
Proceedings of the Sid. vol. 28, No. 2, 1987, Los Angeles US pp. 141-144; T. Sunata et al: "A Large-Area High-Resolution Active-Matric Color LCD" p. 141.
Patent Abstracts of Japan vol. 10, No. 95 (E-395)12 Apr. 1986 & JP-A-60 236 266 (Matsushita) 25 Nov. 1985.
Patent Abstracts of Japan vol. 8, No. 194 (E-264)6 Sep. 1984 & JP-A-59 082 769 (Suwa Seikosha) 12 May 1984.

Primary Examiner—Stuart S. Levy
Assistant Examiner—Tai V. Duong
Attorney, Agent, or Firm—Nixon & Vanderhye

[57]    ABSTRACT

An active matrix display device which includes a pair of insulating substrates, a first group of buses formed on one of the sides of the insulating substrates, a second group of buses crossing the first group of buses, conductive film wirings formed on the second group of buses, wherein the width of each conductive film wiring at stepped portions of the first group of buses is not smaller than that of the conductive film wirings located out of the stepped portions.

4 Claims, 3 Drawing Sheets

ACTIVE MATRIX DISPLAY DEVICE

BACKGROUND OF THE INVENTION

1. Field of the Invention:

The present invention relates to a display device which displays by impressing drive signals on pixel electrodes used for display through switching elements, and more particularly to a display device which can perform a high density display by arranging pixel electrodes in a matrix.

2. Description of the Prior Art:

A liquid crystal display device, an EL display device and a plasma display device are known in the art in which pixel electrodes are selected and driven so as to display desired patterns on a screen. The display medium sealed between the electrodes is optically modulated by impressing a voltage between the selected pixel electrodes and the respective counter electrodes. The optical modulation is visually observed. An active matrix driving method is known as a driving method of pixel electrode. The active matrix driving method will be described as follows:

Pixel electrodes are independently arranged, and then provided with switching elements. The pixel electrodes are driven through the switching elements. TFTs (thin film transistor), MIMs (metal-insulating layer-metal), MOS transistors, diodes, varistors and other known devices are known as switching elements which select and drive the pixel electrodes. This type of active matrix method enables the display device to have a good contrast in the picture, and finds many applications such as in television, word processors, and display panels of computer terminals.

In the known active matrix display devices, buses are likely to be formed with the possibility of breakage during the fabrication of switching elements, buses, pixel electrodes on the active matrix substrate. A possible breakage of buses is detected as a line defect on the screen. The line defect is fatal for the display device. Defective display devices must be discarded, thereby decreasing production yield of display devices.

In order to solve these problems mentioned above, various proposals have been made. One example is shown in FIG. 6. FIG. 6 shows an active matrix display which is driven by TFTs 31. The active matrix has a structure made by two layers in which a conductive film wiring 23 is stacked on source buses 22 which cross over gate buses 21. This active matrix has a dual structure which includes conductive film wiring 23 arranged on the source buses 22. This dual structure is obtained by leaving the transparent conductive film on the source buses 22 after the source buses 22 are formed in pattern, when pixel electrodes 41 are formed with a transparent conductive film.

However, in the dual structure described above, the source buses 22 and the conductive film wirings 23 pass portions stepped by the gate buses at the junctions of the gate buses 21 and the source buses 22, so that the source buses 22 and a conductive film wiring 23 are likely to break. This is caused by the fact that the source buses 22 and the conductive film wiring 23 do not fully cover the stepped portions made by the gate buses 21, and that the source buses 22 and the conductive film wiring 23 are separated owing to poor adhesion of the insulating films to the source buses 22. The problem of breakage is nevertheless not solved by the dual structure.

In addition, when the source buses 22 are fabricated by etching, the etchant is likely to erode the metal parts of the source buses 22. The source buses 22 are liable to breakage.

SUMMARY OF THE INVENTION

The active matrix display device of the present invention, which overcomes the above-discussed and numerous other disadvantages and deficiencies of the prior art, comprises a pair of insulating substrates, a first group of buses formed on one of the sides of the insulating substrates, a second group of buses crossing the first group of buses, conductive film wirings formed on the second group of buses, wherein the width of each conductive film wiring at stepped portions of the first group of buses is not smaller than that of the conductive film wirings located out of the stepped portions.

In a preferred embodiment, the active matrix display device, further comprises an additional capacitance for maintaining charges stored in the pixel electrode, and an additional capacitance wiring located opposite to the pixel electrode.

In a preferred embodiment, the active matrix display device further comprises a first layer of a-Si(i) and a second layer of SiNx both held between the first group of buses and the second group of buses.

In a preferred embodiment, the two additional layers are formed in pattern.

Thus, the invention described herein makes possible the objective of providing an active matrix display device which can maintain electric connection even in the case where the second group of buses are broken, thereby maintaining high production yield.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Example 1

Figure 1:
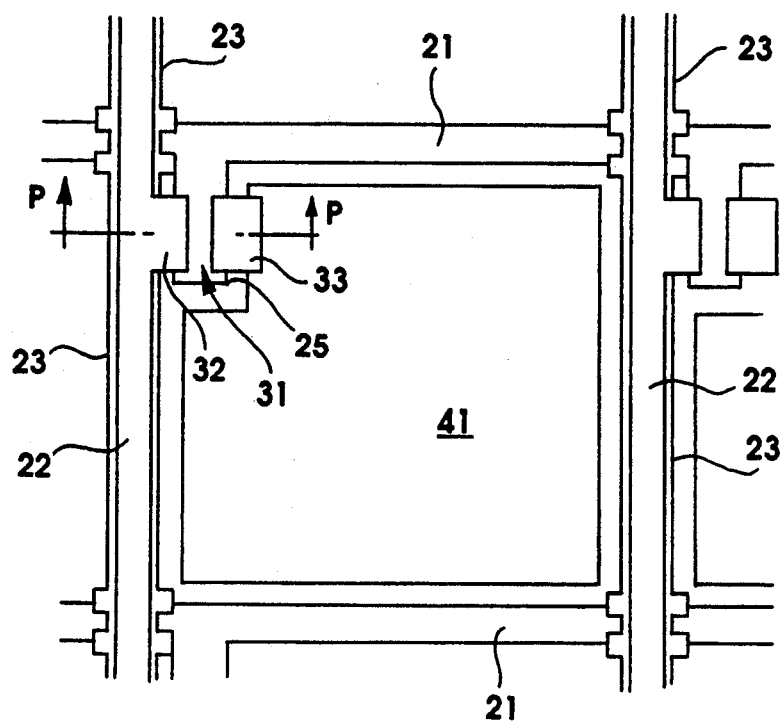
FIG. 1 is a plan view showing an active matrix substrate used in a first example of an active matrix display device according to the present invention.
Figure 2:
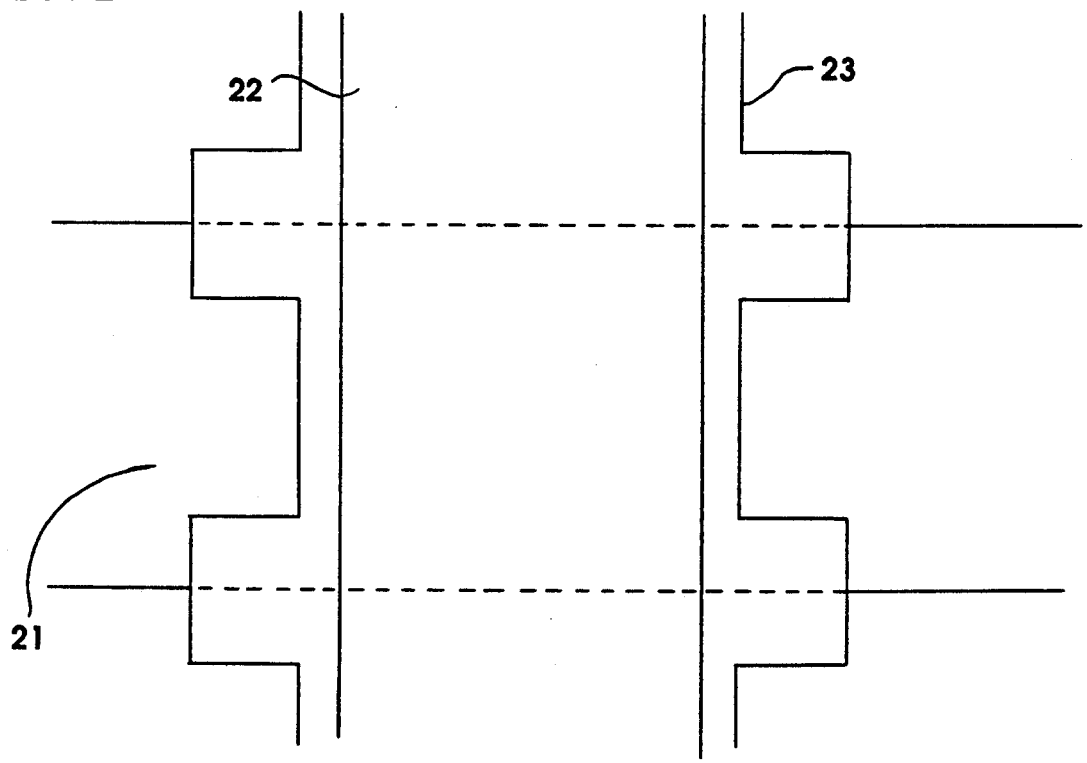
FIG. 2 is a plan view on an enlarged scale showing portions where gate buses and source buses in FIG. 1 cross.
Figure 3:
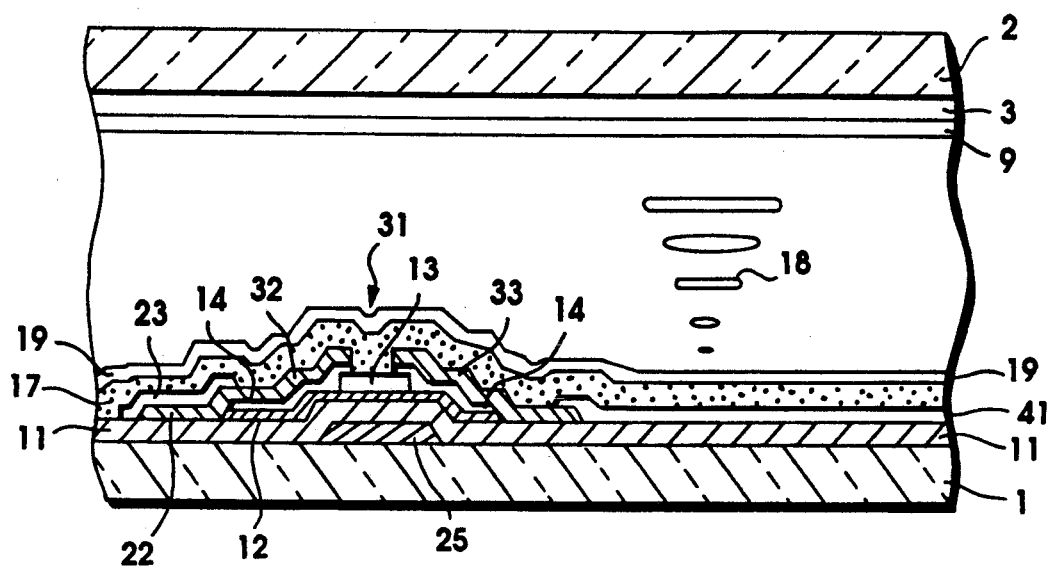
FIG. 3 is a sectional view taken along the line p—p in FIG. 1.

Referring to FIGS. 1 to 3, a first example of the invention will be described:

The active matrix substrate includes the gate buses 21 in parallel with each other, the source buses 22 crossing the gate buses, and the conductive film wiring 23. The substrate 1 also includes gate bus branch lines 25 branched from the gate buses 21. The TFTs 31 are formed on the gate electrode 25.

As shown in FIG. 2, which shows a junction where the gate buses 21 and the source bus 22 cross each other, the conductive film wiring 23 have a larger width on the stepped portions of the gate buses 21 than parts thereof located out of the stepped portions.

The process of fabricating the active matrix substrate will be described:

A metal layer is deposited on the glass substrate by sputtering, and then it is formed into the gate buses 21 and the gate bus branch lines 25 by patterning. To form the metal layer, instead of Ta, Ti, Al or Cr can be used, wherein the metal layer can be made as a single layer or a multi-layer. If necessary, the whole surface of the glass substrate can be coated with a base film of $Ta_2O_5$ or any other suitable metal oxides before the gate buses 21 are formed.

Next, the gate insulation film 11 is formed on the gate buses 21 by depositing SiNx as a film having a thickness of 300 nm by a plasma CVD method. Before the gate insulation film 11 is formed, the surfaces of the gate buses 21 and the gate bus branch line 25 can be anode-oxidized so as to enhance the insulating ability of the gate buses 21 and the gate bus branch lines 25.

The next step is that an intrinsic semiconductor amorphous silicon (hereinafter called "a-Si(i)") layer, which eventually becomes a semiconductor layer 12, and a SiNx layer, which functions as an etching stopper 13, are successively deposited by a plasma CVD method. The a-Si(i) layer has a thickness of 30 nm and the SiNx layer has a thickness of 200 nm. In addition, a layer of amorphous silicon of n+ type containing P (phosphorus) (hereinafter called a-Si(n+)), which eventually becomes a contact layer 14, is deposited on the two layers by a CVD method. The a-Si(n+) layer has a thickness of 80 nm. The semiconductor layer 12 and the contact layer 14 are formed by patterning the a-Si(n+) layer and the a-Si(i) layer. The contact layer 14 provides ohmic contact between the semiconductor layer 12 and the source electrode 32 and the drain electrode 33, both of which are formed at a later stage.

Then, the source buses 22, the source electrode 32 and drain electrode 33 are formed by depositing a Ti metal layer over the whole substrate 1 and then patterning it. Instead of Ti, for example, Al, Mo, and Cr can be used for the metal layer.

Then, an ITO (Indium Tin Oxide) film is deposited over the whole surface of the substrate 1 by sputtering to form a layer having a thickness of 100 nm, and then this layer is patterned into the pixel electrode 41 and the conductive film wiring 23. The pixel electrodes 41 are electrically connected to the drain electrode 33. Each conductive film wiring 23 is not narrower than the source bus 22, and is overlaid on it. Preferably, as shown in FIG. 2, at junctions where the gate buses 21 and the source buses 22 cross each other, the width of each conductive film wiring 23 at the stepped portion is not smaller than the width thereof located out of the stepped portions.

Finally, a protective layer 17 of SiNx is formed over the whole surface of the substrate 1. The protective layer 17 can be a window-open type; that is, the protective layer 17 is partly removed in a central portion of the pixel electrode. In addition, an orientation film 19 can be formed on the protective layer 17. A counter substrate facing the active matrix substrate is fabricated with a counter electrode 3 and substrate is fabricated with a counter electrode 3 and an orientation film 9 on a substrate 2. A liquid crystal layer 18 is placed and sealed between the counter electrode 3 and the substrate 1. In this way, the active matrix display device is fabricated.

In the illustrated active matrix display device, the conductive film wiring 23 over any stepped portions at the junctions where the conductive film wiring 23 and the gate buses 21 cross each other has a relatively great width so that even if the source buses 22 break at the stepped portion, the broken source bus or buses can maintain an electric connection because of a lessened degree of breakage.

Example 2

Figure 4:
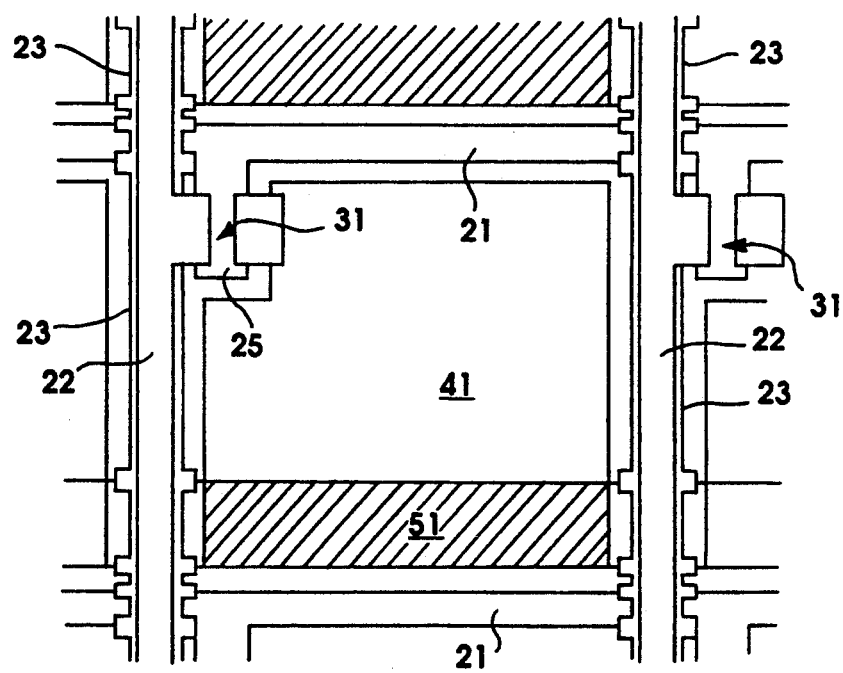
FIG. 4 is a plan view showing an active matrix substrate used in another example of the present invention.
Figure 5:
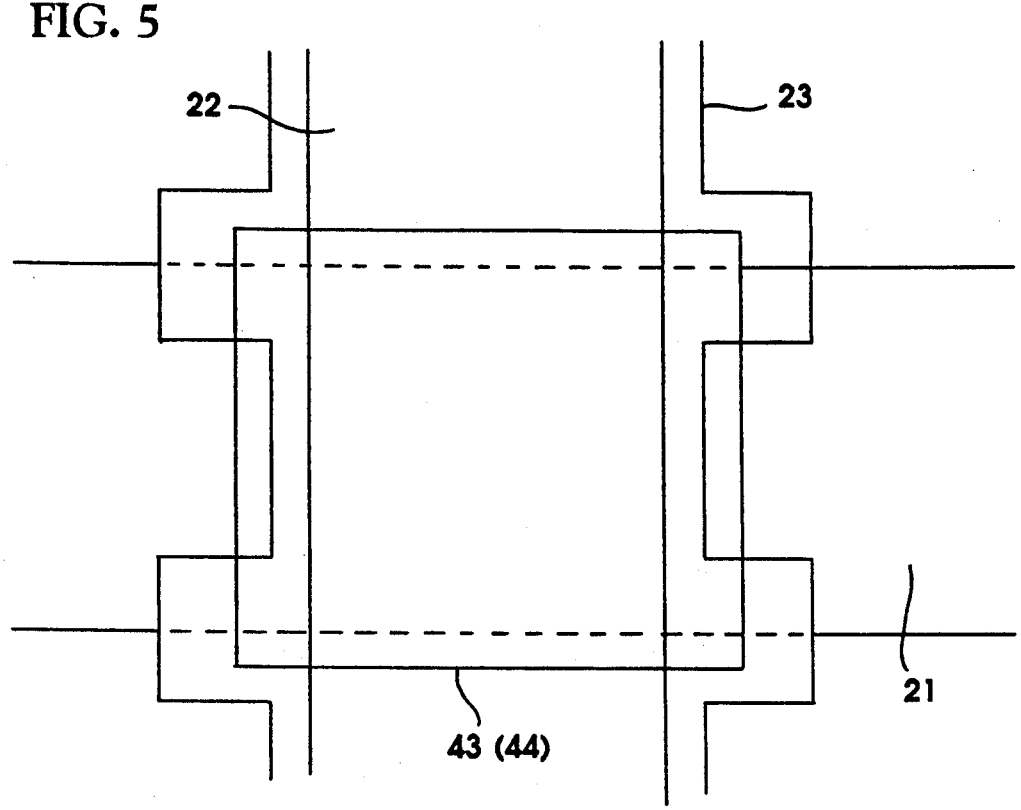
FIG. 5 is a plan view on an enlarged scale showing junctions where gate buses and source buses of the active matrix substrate used a third example according to the present invention cross.
Figure 6:
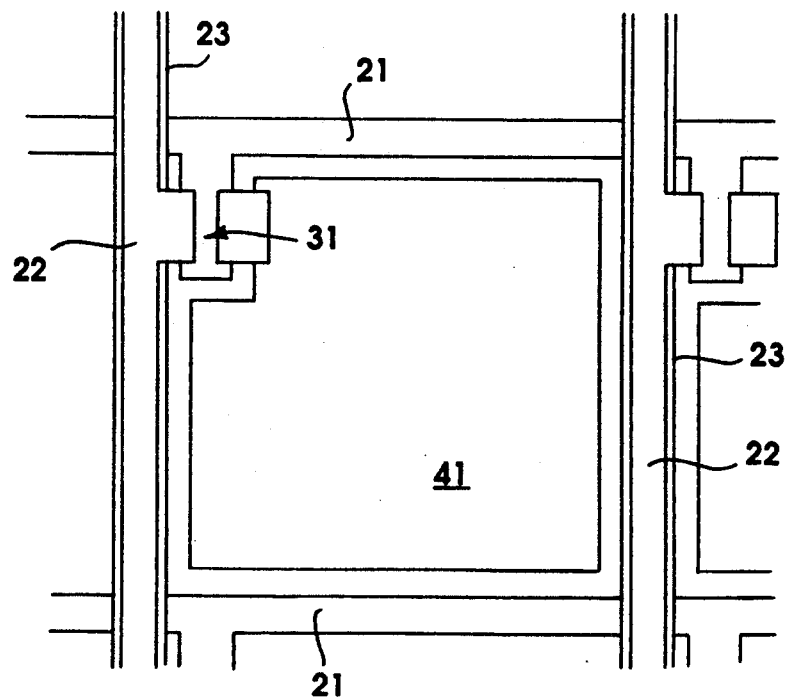
FIG. 6 is a plan view showing a conventional active matrix substrate.

Referring to FIG. 4, a second example of the invention will be described:

This active matrix display device contains an additional capacitance 51 to hold charges stored in the pixel electrode. The additional capacitance 51 is formed between the pixel electrode 41 and an additional capacitance wiring 42. The additional capacitance wiring 42 is formed at the same time as when the gate buses 21 are formed. The additional capacitance wiring 42 is located opposite to the pixel electrode 41 with the gate insulating film 11 sandwiched therebetween. The same signal is applied to the counter electrode 3 and the additional capacitance wiring 42. Therefore the additional capacitance 51 and a pixel capacitance formed by the pixel electrode 41 and the counter electrode 3 become parallel.

In the second example, as in Example 1, the conductive film wiring 23 is relatively wider over the stepped portions at the junctions where the conductive film wiring 23 and the gate buses 21 cross each other. In addition, the conductive film wirings 23 are relatively wide at the stepped portions at the junctions where the gate buses 21 and the additional capacitance wiring 42 cross each other. As a result, the additional capacitance wiring 42 prevents breakage of the conductive film wiring 23.

Example 3

In this example, an a-Si(i) layer 44 and a SiNx layer 43 are held between the gate buses 21 and source buses 22. The a-Si(i) layer 44 and the SiNx layer 43 are pattern-formed at the same time as when the semiconductor layer 12 and etching stopper 13 are formed. The insulating ability is enhanced between the gate buses 21 and source buses 22.

In this example, the conductive film wiring 23 at the stepped portions caused by the gate buses 21 has a width greater than the other-parts thereof located out of the stepped portions. As a result, the conductive film wirings 23 are protected against breakage or at least they are less liable to breakage. Even if the source buses 22 breaks at the stepped portions, the electrical connection is advantageously maintained.

Instead of the a-Si(i) layer 44 and the SiNx layer 43, these layers can be made of the same materials as that for the contact layer 14. The active matrix substrates of the present invention find many applications such as in display devices using an MIM, an MOS, a transistor, a diode or a varistor as a switching element.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An active matrix display device comprising a substrate, a first group of buses formed on said substrate, a second group of buses crossing the first group of buses, conductive film wirings formed on the second group of buses, a first layer of a-Si(i) and a second layer of SiNx both between the first and second group of buses, wherein each of said conductive film wirings being widened where said wiring steps over an edge of the first group of buses, and the conductive film wirings being wider than said second group of buses, wherein the width of each of said conductive film wirings is greatest where the first group of buses step over the second group of buses, and the width of conductive film wirings at the position of said first and second layers is narrower than that of said first and second layers.

2. An active matrix display device comprises a pair of insulating substrates, a first group of buses formed on one of the sides of the insulating substrates, a second group of buses crossing the first group of buses, conductive film wirings formed on the second group of buses, a first layer of a-Si(i) and a second layer of SiNx both held between the first and second group of buses, wherein each of said conductive film wirings being widened where said wiring steps over an edge of the first group of buses, and the conductive film wirings being wider than said second group of buses, wherein the width of each of said conductive film wirings is greatest where said wirings cover portions of said second group of buses that step over said first group of buses where the first and second group of buses cross, and the conductive film wirings over said first and second layers is narrower than said first and second layers, and said first and second layers having a width wider than said first and second groups of buses.

3. An active matrix display device according to claim 2, further comprising an additional capacitance for maintaining charges stored in a pixel electrode, and an additional capacitance wiring located opposite to the pixel electrode.

4. An active matrix display device according to claim 2, wherein first and second layers are formed in pattern.

* * * * *